United States Patent
Kita et al.

(10) Patent No.: US 6,961,139 B1
(45) Date of Patent: Nov. 1, 2005

(54) IMAGE FORMING SYSTEM, METHOD FOR STORING IMAGE DATA AND MEMORY MEDIA

(75) Inventors: Koji Kita, Tokyo (JP); Kazuyoshi Tanaka, Tokyo (JP)

(73) Assignee: Konica Corporation, Tokyo (JP)

( * ) Notice: Subject to any disclaimer, the term of this patent is extended or adjusted under 35 U.S.C. 154(b) by 1003 days.

(21) Appl. No.: 09/723,633

(22) Filed: Nov. 28, 2000

(30) Foreign Application Priority Data

| Nov. 30, 1999 | (JP) | ................................. 11-339860 |
| Jan. 28, 2000 | (JP) | ............................. 2000-019686 |

(51) Int. Cl.$^7$ .............................................. H04N 1/40
(52) U.S. Cl. ..................................... 358/1.15; 358/468
(58) Field of Search ............................... 358/1.9, 1.15, 358/1.16, 426.01–426.1, 468

(56) References Cited

U.S. PATENT DOCUMENTS

| 5,684,607 A | 11/1997 | Matsumoto |
| 5,764,866 A | 6/1998 | Maniwa |
| 5,768,483 A | 6/1998 | Maniwa et al. |
| 5,911,044 A | 6/1999 | Lo et al. |

FOREIGN PATENT DOCUMENTS

| EP | 0 532 796 A1 | 3/1993 |

Primary Examiner—Thomas D Lee
Assistant Examiner—Stephen Brinich
(74) Attorney, Agent, or Firm—Frishauf, Holtz, Goodman & Chick, P.C.

(57) ABSTRACT

The present invention concerns a print job control system in which image-forming apparatus and computers are coupled each other through a network. The print job control system includes an image-forming apparatus, which includes an image reading section to generate first image data by optically scanning a document and conducting an optoelectronic converting operation, a first memory to store the first image data, header data corresponding to a property of the first image data, and job data corresponding to a property of an image-forming job including the first image data generated from a plurality of pages of the document, an image-forming section to form images based on the first image data stored the first memory, and a first network interface to bilaterally transmit the first image data between the first memory and a network of the network system; and a computer, which includes a second network interface, a second memory, and a control section to control an operation for storing data, received through the second network interface, in the second memory; wherein the control section creates a directory corresponding to the first image data, the header data and the job data in the second memory, and stores a job management file created based on the header data and the job data, each of which corresponds to the image-forming job, and second image data generated by converting the first image data, corresponding to the image-forming job, in the directory.

21 Claims, 10 Drawing Sheets

IMAGE FORMING SYSTEM, METHOD FOR STORING IMAGE DATA AND MEMORY MEDIA

BACKGROUND OF THE INVENTION

The present invention relates to an image data storing method and an image-forming system in which image-forming apparatus and information-processing apparatus are coupled each other through a network, and also relates to a recording media, which store programs being readable for the information-processing apparatus.

There has been an image-forming system in which a digital copier equipped with networking functions, serving as an example of image-forming apparatus, and a personal computer, serving as an example of information-processing apparatus, are coupled each other through a network. Although, generally speaking, in the image-forming system, the image data outputted by the personal computer are transferred to the digital copier through the network, and the digital copier outputs the image based on the transferred image by using the network printing function, there are some examples in which the image data, generated by the scanner unit equipped in the digital copier, is further transferred to the personal computer.

When a document, having a plurality of pages, is read by the scanner unit equipped in the digital copier as a consecutive unit job to generate the image data, page data in the form of "header area+image data" for every page, and job data, which includes address data indicating the start position of the page data on the image memory and set data of the job, for every job, are developed on the image memory. Since the page data and job data are arranged in a format to be processed by the control program of the digital copier, and also transferred to the personal computer in the form of binary data, in order to process them as the image data, it is impossible for the user to handle them. Therefore, there has been a problem that it is difficult for the user to edit the image data of a plurality of pages, generated as a unit job, by means of the personal computer.

Further, there has been another problem that, since most of the image data area in the image memory is formed in a specific format exclusive for the digital copier, and sometimes, an exclusive compression algorism is employed for compressing the image data to save the memory capacity, it is impossible to edit the image data in most of the cases, even if the general-purpose application software for editing images is introduced in the personal computer.

SUMMARY OF THE INVENTION

To overcome the abovementioned drawbacks in conventional image-forming systems, it is an object of the present invention to provide an image-forming system, which makes it possible to transfer image data, generated by reading a plurality of pages of a document as a consecutive job in an image-forming apparatus, to an information-processing apparatus, so that a user can easily handle the transferred image data with an application software for editing images at the information-processing apparatus.

Accordingly, to overcome the cited shortcomings, the abovementioned object of the present invention can be attained by print job control systems and methods described as follow.

(1) A print job control system on a network system, comprising: an image-forming apparatus, which comprises an image reading section to generate first image data by optically scanning a document and conducting an optoelectronic converting operation, a first memory to store the first image data, header data corresponding to a property of the first image data, and job data corresponding to a property of an image-forming job including the first image data generated from a plurality of pages of the document, an image-forming section to form images based on the first image data stored the first memory, and a first network interface to bilaterally transmit the first image data between the first memory and a network of the network system; and a computer, which comprises a second network interface, a second memory, and a control section to control an operation for storing data, received through the second network interface, in the second memory; wherein the control section creates a directory corresponding to the first image data, the header data and the job data in the second memory, and stores a job management file created based on the header data and the job data, each of which corresponds to the image-forming job, and second image data generated by converting the first image data, corresponding to the image-forming job, in the directory.

(2) The print job control system of item 1, wherein, with regard to the image-forming job, each of the job management file and the second image data is independently stored in the directory by the control section.

(3) The print job control system of item 1, wherein the computer further comprises an image data editing section, and the second image data is formed in such a format that the image data editing section can edit the second image data.

(4) The print job control system of item 3, wherein the image data editing section only edits the second image data, and can store a third image data, generated by editing the second image data, in the directory.

(5) The print job control system of item 1, wherein the control section transfers the second image data and the job management file, both of which are stored in the directory, to the image-forming apparatus through the second network interface in a unit of the image-forming job.

(6) The print job control system of item 5, wherein the control section converts a data format of the second image data and the job management file, stored in the directory, so that the image-forming apparatus can form the images based on the second image data and the job management file, before transferring them to the image-forming apparatus.

(7) The print job control system of item 6, wherein the control section reproduces file data, in which the header data and the image data are connected each other, based on the second image data and the job management file, and, thereafter, transfers the file data to the image-forming apparatus.

(8) The print job control system of item 7, wherein the file data are such data that the image-forming apparatus can form the images based on the file data.

(9) The print job control system of item 5, wherein the computer comprises a monitor for monitoring an editing process of the second image data.

(10) The print job control system of item 1, wherein the control section can transmit a command signal for request of transferring the first image data, the header data and the job data through the second network interface to the image-forming apparatus.

(11) The print job control system of item 11, wherein the image-forming apparatus further comprises a transmitting section to transmit the first image data, the header data and the job data through the first network interface.

(12) A method for performing a bilateral data transmission and a data storing operation between an image-forming apparatus, which includes a scanner section and printer section, and a computer in a network, comprising the steps of: transmitting first image data, header data, corresponding to a property of the first image data, and job data, corresponding to a property of an image-forming job including the first image data generated from a plurality of pages, to the computer from the image-forming apparatus on the network; converting the first image data, received by the computer, to a second image data; creating a job management file based on the header data and the job data; creating a directory on a memory, included in the computer, as a unit of the image-forming job; and storing the second image data and the job management file in the directory as a unit of the image-forming job.

(13) The method of item 12, wherein, with regard to the image-forming job, each of the job management file and the second image data is stored in the directory as independent data.

(14) The method of item 12, further comprising the step of: transferring the second image data and the job management file, both of which are stored in the directory, to the image-forming apparatus through a network interface in a unit of the image-forming job.

(15) The method of item 14, further comprising the step of: converting a data format of the second image data and the job management file, stored in the directory, so that the image-forming apparatus can form images based on the second image data and the job management file, before transferring them to the image-forming apparatus.

(16) The method of item 15, further comprising the step of: reproducing file data, in which the header data and the image data are connected each other, based on the second image data and the job management file.

(17) An image data storing program, being readable by a computer, comprising the processes of: receiving first image data, header data, corresponding to a property of the first image data, and job data, corresponding to a property of an image-forming job including the first image data generated from a plurality of pages; converting the first image data, received by the computer, to a second image data; creating a job management file based on the header data and the job data; creating a directory on a memory as a unit of the image-forming job; and storing the second image data and the job management file in the directory as a unit of the image-forming job.

(18) The image data storing program of item 17, wherein the image data storing program is stored in a recording medium being readable by the computer.

(19) The image data storing program of item 17, wherein, with regard to the image-forming job, each of the job management file and the second image data is stored in the directory as independent data.

(20) The image data storing program of item 17, further comprising the process of: transferring the second image data and the job management file, both of which are stored in the directory, to the image-forming apparatus through a network interface in a unit of the image-forming job.

(21) The image data storing program of item 17, further comprising the process of: converting a data format of the second image data and the job management file, stored in the directory, so that the image-forming apparatus can form images based on the second image data and the job management file, before transferring them to the image-forming apparatus.

(22) A computer, being connectable to a network, comprising: a network interface, a memory, and a control section to control an operation for storing data, received through the network interface, in the memory; wherein the computer receives first image data, header data corresponding to a property of the first image data and job data corresponding to a property of an image-forming job including the first image data generated from a plurality of pages, from an image-forming apparatus coupled to the network, and the control section creates a directory in the memory, and stores second image data generated by converting the first image data, the header data and a job management file created based on the job data, in the directory as a unit of the image-forming job.

(23) The computer of item 22, wherein, with regard to the image-forming job, each of the job management file and the second image data is stored in the directory as independent data.

(24) The computer of item 22, wherein the control section transfers the second image data and the job management file, both of which are stored in the directory, to the image-forming apparatus through the network interface in a unit of the image-forming job.

(25) The computer of item 24, wherein the control section converts a data format of the second image data and the job management file, stored in the directory, so that the image-forming apparatus can form images based on the second image data and the job management file, before transferring them to the image-forming apparatus.

Further, to overcome the abovementioned problems, other image-forming systems, embodied in the present invention, will be described as follow:

(26) An image-forming system, characterized in that the image-forming system comprises an image-forming apparatus, which is coupled to a network and includes an image reading means to obtain image data by optically scanning a document and conducting an optoelectronic converting operation, a memory means to store the image data, header information corresponding to a property of the image data, and job information corresponding to a property of an image-forming job including the image data generated from a plurality of pages and an image-forming means to form images based on the image data outputted from the memory means, and an information-processing apparatus, which is coupled to the network and includes a data memory means accessible of arbitral data, to perform a data transferring operation between the image-forming apparatus and the information-processing apparatus through the network, and the image-forming system performs the operations of: requesting a transmission of the image data, the header information and the job information; creating a directory for storing the image data, the header information and the job information, corresponding to one job; connecting the header information with the job information as a job management file; converting a plurality of the image data, corresponding to the one job, into a plurality of image files, respectively; and storing the job management file and the image file of a plurality of pages in the directory created in the data storing means.

According to the abovementioned image-forming system, since the job management file and the image file of a plurality of pages are stored in the directory, it is possible to transfer the image data, so that the user can easily handle the image data at the information-processing apparatus, even when the image data, generated by reading a plurality of pages of the document as a consecutive job, are transferred to the information-processing apparatus.

(27) An image storing method, characterized in that, in the image-forming system comprising an image-forming apparatus, which is coupled to a network and includes an image reading means to obtain image data by optically scanning a document and conducting an optoelectronic converting operation, a memory means to store the image data, header information corresponding to a property of the image data, and job information corresponding to a property of an image-forming job including the image data generated from a plurality of pages and an image-forming means to form images based on the image data outputted from the memory means, and an information-processing apparatus, which is coupled to the network and includes a data memory means accessible of arbitral data, to perform a data transferring operation between the image-forming apparatus and the information-processing apparatus through the network, the image data storing method for storing the image data in the data memory means, comprises the steps of: requesting a transmission of the image data, the header information and the job information; creating a directory for storing the image data, the header information and the job information, corresponding to one job; connecting the header information with the job information as a job management file; converting a plurality of the image data, corresponding to the one job, into a plurality of image files, respectively; and storing the job management file and the image file of a plurality of pages in the directory created in the data storing means.

According to the abovementioned image data storing method, since the job management file and the image file of a plurality of pages are stored in the directory, it is possible to transfer the image data, so that the user can easily handle the image data at the information-processing apparatus, even when the image data, generated by reading a plurality of pages of the document as a consecutive job, are transferred to the information-processing apparatus.

(28) A recording medium, readable by an information-processing apparatus, to store an image data storing program, which is characterized in that, in the image-forming system comprising an image-forming apparatus, which is coupled to a network and includes an image reading means to obtain image data by optically scanning a document and conducting an optoelectronic converting operation, a memory means to store the image data, header information corresponding to a property of the image data, and job information corresponding to a property of an image-forming job including the image data generated from a plurality of pages and an image-forming means to form images based on the image data outputted from the memory means, and the information-processing apparatus, which is coupled to the network and includes a data memory means accessible of arbitral data, to perform a data transferring operation between the image-forming apparatus and the information-processing apparatus through the network, the image data storing program, stored in the data memory means of the information-processing apparatus, comprises the processes of: requesting a transmission of the image data, the header information and the job information; creating a directory for storing the image data, the header information and the job information, corresponding to one job; connecting the header information with the job information as a job management file; converting a plurality of the image data, corresponding to the one job, into a plurality of image files, respectively; and storing the job management file and the image file of a plurality of pages in the directory created in the data storing means.

According to the recording medium, which stores the image data storing program, since the job management file and the image file of a plurality of pages are stored in the directory, it is possible to transfer the image data, so that the user can easily handle the image data at the information-processing apparatus, even when the image data, generated by reading a plurality of pages of the document as a consecutive job, are transferred to the information-processing apparatus.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

An image forming system, being an embodiment of the present invention, will be detailed in the following.

Figure 1:
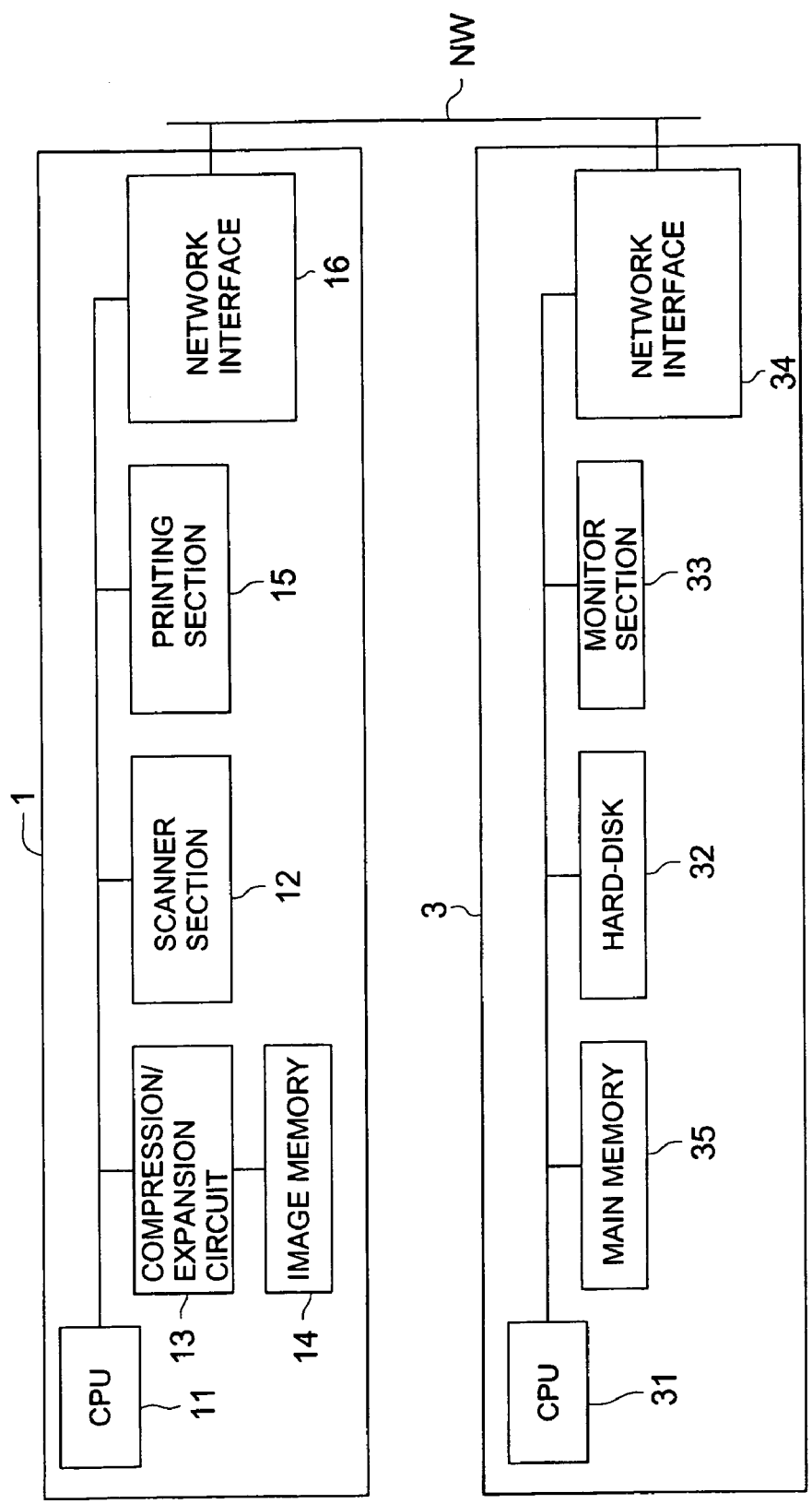
FIG. 1 shows a block-diagram of an image forming system, illustrating a basic configuration of it.

FIG. 1 shows a block-diagram of an image forming system, illustrating a basic configuration of it.

In the image forming system, image-forming apparatus 1 and information-processing apparatus 3 are coupled to each other through network NW. In other words, the image forming system is so constituted that a bilateral data transferring section operation between image-forming apparatus 1 and information-processing apparatus 3 is possible through network NW. Incidentally, although in FIG. 1 there is indicated an embodiment in which only image-forming apparatus 1 and information-processing apparatus 3 are coupled to each other through network NW, it is also applicable that other image-forming apparatuses, other information processing apparatuses and other apparatuses are further coupled to network NW. Network NW is comprised of a parallel or serial transmission line made of copper wires or optical fibers, so that the data can be bilaterally communicated in the network. Of course, a Local Area Network, such as an Ethernet, etc., is a typical example of network NW.

Image-forming apparatus 1 serves as a digital copier, which incorporates a function of network printer for forming an image on a recording sheet based on image data, and includes CPU 11, scanner section 12, compression/expansion circuit 13, image memory 14, printing section 15, network interface 16, etc.

Scanner section 12, serving as an image reading mean, performs the opto-electric conversion processing by optically scanning the image of the document, and various kinds of well-known image-processing, such as the shading compensation processing, the binary encoding processing, etc., to obtain the image data. In the image-forming apparatus, employed in the image forming system embodied in the present invention, it is also possible to employ an automatic document reader, combined with an automatic document feeder (ADF) which make it possible to read a plurality of documents stacked on the tray by scanning every pages one by one.

Compression/expansion circuit 13 is a means for compressing the image data obtained in scanner section 12 to generate a compressed image data and for expanding the compressed image data to reproduce the original image data. Incidentally, the compressed image data is one of forms of the image data, generated by simply compressing the image data. Since compression/expansion circuit 13 is provided in an ASIC (Application Specific Integrated Circuit) in which predetermined compressing/expanding algorithms are fabricated as a hardware circuit, the time required for compressing or expanding the image data can be desirably shortened to maintain the real-time processing mode. It is also applicable, however, that CPU 11 compresses the image data based on the compressing program, being software of the compressing algorithm, and expands the compressed image data based on the expanding program, being software of the expanding algorithm. Further, it is also applicable that the compression circuit and the expansion circuit are individually provided in separate integrated circuits.

Image memory 14, serving as a memorizing means for memorizing data, stores the compressed image data generated by compression/expansion circuit 13 in the present embodiment. Further, as described later, copy conditions coded as control data, header data and job data are stored in image memory 14. It is desirable that semiconductor memories, such as DRAM, SRAM, etc., are employed for image memory 14 so as to expedite the high-speed access with CPU 11. Incidentally, as described later, image memory 14 is so constituted that image memory 14 can also store the image data and the compressed image data transferred from information-processing apparatus 3 through network NW. When storing the non-compressed image data, the image data are inputted/outputted into/from image memory 14, bypassing compression/expansion circuit 13.

Printing section 15, serving as an image forming means, forms an image on the recording sheet, based on the image data expanded by compression/expansion circuit 13, namely, the image data being equivalent to the image data directly outputted from scanner section 12. In the present embodiment, the electro-photographic method, in which a toner image is recorded on the recording sheet, is employed. For instance, an image forming means employing an ink-jetting method can be also utilized as printing section 15.

Network interface 16, serving as a connecting means, connects image-forming apparatus 1 to network NW, and interchanges data with information-processing apparatus 3 and other apparatus (not shown in the drawings). As detailed in the following, image-forming apparatus 1 can transfer the image data read by scanner section 12 to information-processing apparatus 3 through network interface 16 and network NW, and can store the image data transferred from information-processing apparatus 3 into image memory 14, so as to form the image in printing section 15.

CPU 11 is a processor for conducting control programs for controlling operating actions of scanner section 12, compression/expansion circuit 13, image memory 14, printing section 15, network interface 16, etc., and serves as a main controlling means as well as a distributed processing control means in the image forming system.

Now, the operating actions of image-forming apparatus 1 will be briefed in the following, in case that image-forming apparatus 1 is utilized as a copier.

Initially, a user puts a plurality of documents on the document tray (not shown in the drawings), and inputs copy conditions from the operating section (not shown in the drawings). The copy conditions are selected in a wide range of options, such as number of copies, duplex or one side copy mode, size of the recording sheet, choice of the image quality, presence or absence of the image processing such as the rotating processing, etc., choice of the finishing operations, etc. When the inputting action of the copy conditions is completed, the user pushes the copy start button equipped on the operating section (not shown in the drawings). Based on the above command, the automatic document feeder conveys the document one by one from the document tray to scanning section 12 by which the image on each document is read one by one, so as to read the images residing on a plurality of the documents. The image data, read by scanning section 12, is compressed by compression/expansion circuit 13, and stored in image memory 14 as the compressed image data. On the other hand, the copy conditions are also stored in image memory 14 as the control data, associating with the image data (to be detailed later). Then, the compressed image data, stored in image memory 14, are expanded by compression/expansion circuit 13 to reproduce the image data being equivalent to the image data outputted by scanner section 12, and the image data are fed to printing section 15, which prints the image on the recording sheet based on the image data in response to the copy conditions.

Information-processing apparatus 3 is a general-purpose personal computer, so to speak, which can perform various kinds of application programs, operations for editing and creating files, operations for displaying contents of files (images and descriptions), and further, operations for transferring printing data coded by the PDL (Page description Language), such as the PostScript, etc., to image-forming apparatus 1, which forms images based on the printing data transferred. Information-processing apparatus 3 includes CPU 31, hard-disk 32, monitor section 33, network interface 34, main memory 35, etc.

CPU 31 serves as a main controlling means as well as a distributed processing control means in the image forming system, which conducts programs of the operating system, application software for editing images, etc., by reading the programs stored in hard-disk 32, while using main memory 35.

Hard-disk 32, being a rewritable and non-volatile memory means, serves as a data memory means, in which data, formatted in a form of various kinds of files (such as document data files, image data files, etc.), are arbitrarily accessible in response to the command of the operating system. Further, although a single hard-disk 32 is provided in the present embodiment, it is also possible to provide a plurality of hard-disks or removable memory means, such as, for instance, a floppy disk, a magnet-optics disk, etc.

Monitor section 33 serves as a displaying means for displaying images based on the image data read from hard-disk 32 in response to the command of the operating system. When the user instructs the displaying action of an arbitral file by operating the application software for editing images, the operating system can send a command for displaying the contents of the file.

Network interface 34, serving as a connecting means, connects information-processing apparatus 3 to network NW, and interchanges data with information-processing apparatus 3 and other apparatus (not shown in the drawings).

Needless to say that both network interface 16 of image-forming apparatus 1 and network interface 34 of information-processing apparatus 3 perform the data transferring operation through network NW based on a common protocol.

Main memory 35 is a random access memory, directly accessed by CPU 31, as well as a volatile memory means, which provides memory regions utilized for the programs of the operating system, the application software for editing images, etc. Further, the application software for editing images make it possible to temporally store a file in main memory 35 and to perform editing operations.

Compression/expansion programs are stored in hard-disk 32 of information-processing apparatus 3 in a form of software, which are equivalent to the compressing/expanding algorithms provided in compression/expansion circuit 13 of image-forming apparatus 1 as a hardware circuit. Accordingly, CPU 31 can read the compression/expansion programs from hard-disk 32 to compress or expand the file (image data file) stored in hard-disk 32. In other wards, information-processing apparatus 3 is provided with functions of compressing the image data into the compressed image data and expanding the compressed image data to the original image data. Namely, the compression program is utilized for compressing the image data to generate the compressed image data, which is expandable by means of compression/expansion circuit 13 of image-forming apparatus 1, while the expansion program is utilized for expanding the compressed image data, which is compressed by compression/expansion circuit 13 of image-forming apparatus 1, to reproduce the image data. Although information-processing apparatus 3, being a general purpose computer, has the compression/expansion functions in a form of software programs, it is of cause applicable for information-processing apparatus 3 to employ an integrated circuit in which the compressing algorithm and the expanding algorithm are embedded as the hardware circuit as well as compression/expansion circuit 13 of image-forming apparatus 1.

Further, an image data storing program, embodied in the present invention, is also stored in hard-disk 32. The operations of the image data storing program will be detailed later.

Figure 2:
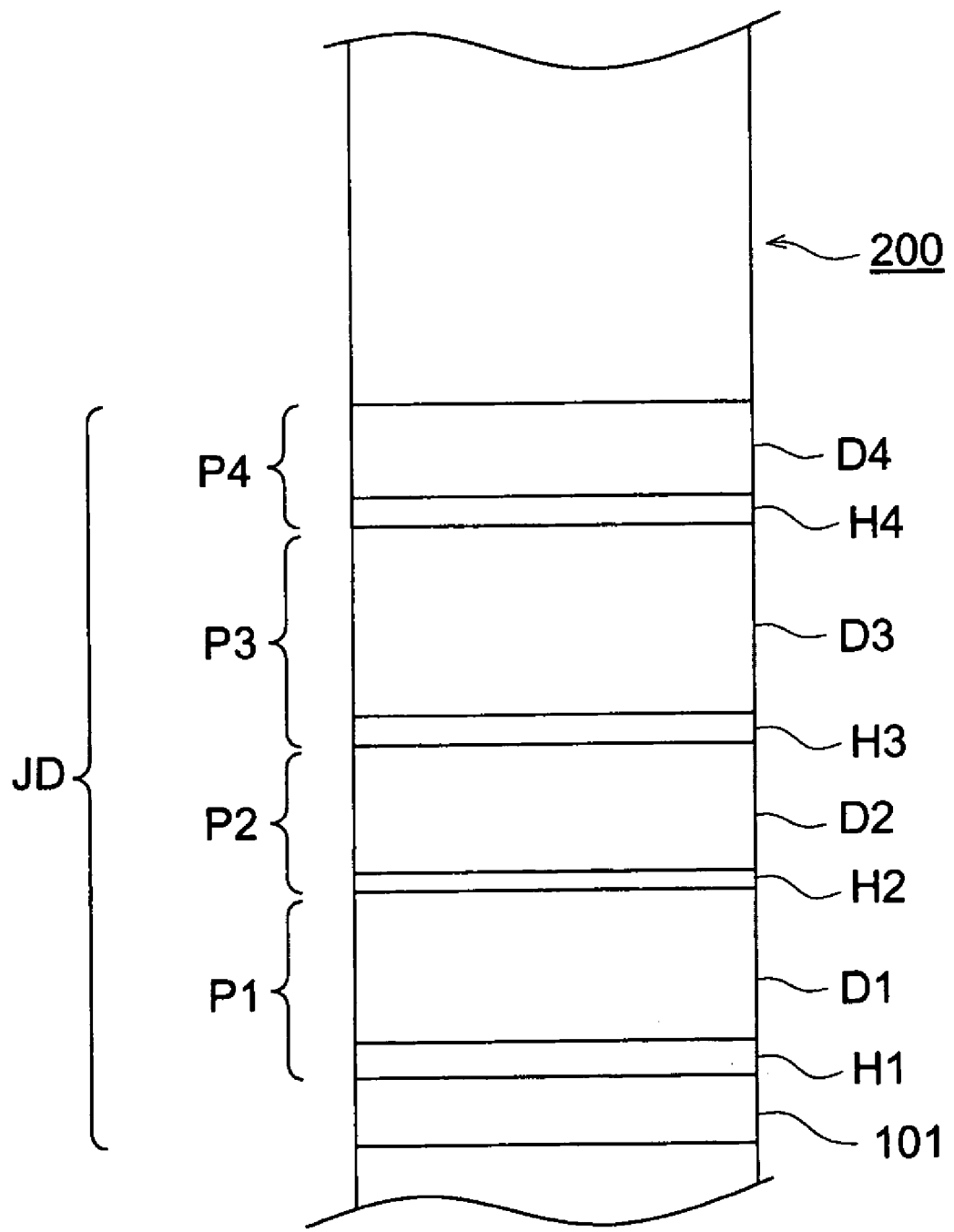
FIG. 2 shows a detailed schematic of a memory region in an image memory.

FIG. 2 shows a detailed schematic of the memory region in image memory 14 shown in FIG. 1. Image memory 14 provides a memory capacity such an extent that the compressed image data, being equivalent to, for instance, 100 pages of A4 size, can be stored. In FIG. 2, job data JD indicates a region in which the data of documents including 4 pages are already stored after reading them as one unit job. Job data JD is divided into specific areas, including job data area 101 in which properties with respect to the whole unit job are stored as a header data, header data areas H1, H2, H3, H4, in each of which properties with respect to each page are stored as a header data, and compressed image data areas D1, D2, D3, D4 in each of which the compressed image data with respect to each page are stored corresponding to each of the header data areas. The maximum number of header data area Hn and that of compressed image data area Dn vary in accordance with the number of pages to be read as one unit job.

Each of page data P1, P2, P3, P4, indicates data of each page included in one unit job. In page data Pn, header data area Hn is combined with compressed image data area Dn, and the number of page data Pn to be stored is the same as the number of pages included in one unit job.

The data size of compressed image data, stored in each of compressed image data areas D1, D2, D3, D4, varies in accordance with the number of half-tones (binary/multiple-value), the number of pixels, the image quality (photograph/character/mesh), etc., resulting in variable-length data. The length of each page data is respectively described in each of header data areas H1, H2, H3, H4.

The number of half-tones (binary/multiple-value), the number of pixels, presence or absence of processing (rotating processing, enlarging processing, etc.), the image quality (photograph/character/mesh), etc. are cited as header data described in each of header data areas H1, H2, H3, H4. Further, the length of the data, described in header data area Hn, is also variable-length, which is described at a position being apart from the top of header data area Hn at a predetermined bits number. Of course, the properties described in header data areas Hn can be changed in response to functions of image-forming apparatus 1.

The job data described in job data area 101 includes a number of pages of the unit job concerned, the head addresses of each page data Pn of all pages (which coincide with each head address of header data area Hn), the selected result of either the duplex copy mode or the one side copy mode by user, etc.

Job data JD is constructed in the abovementioned data structure. When CPU 11 reads job data JD by using the control programs, CPU 11 initially reads job data area 101 to grasp each of the head addresses of page data P1–P4, and then, reads each page data Pn.

The job data described in job data area 101 and the header data described in header data area Hn are utilized as controlling parameters for the image forming operations, while the compressed image data described in compressed image data areas Dn is expanded to reproduce the image data outputted to printing section 15.

Vacant region 200, in which no page data, etc. of the unit job are stored, is provided for storing page data, etc. of the next unit job to be read hereafter.

The image forming system, having the abovementioned configuration, is provided with two modes described in the following item (1) and item (2).

(1) The data stored in image memory 14 of image-forming apparatus 1 are transferred to information-processing apparatus 3 through network NW (the scanner mode).

(2) The image data generated in information-processing apparatus 3 are transferred to image-forming apparatus 1 through network NW to form the image in printing section 15 (the printer mode).

Both the scanner mode and the printer mode will be detailed separately in the following.

1) The Scanner Mode

Figure 3:
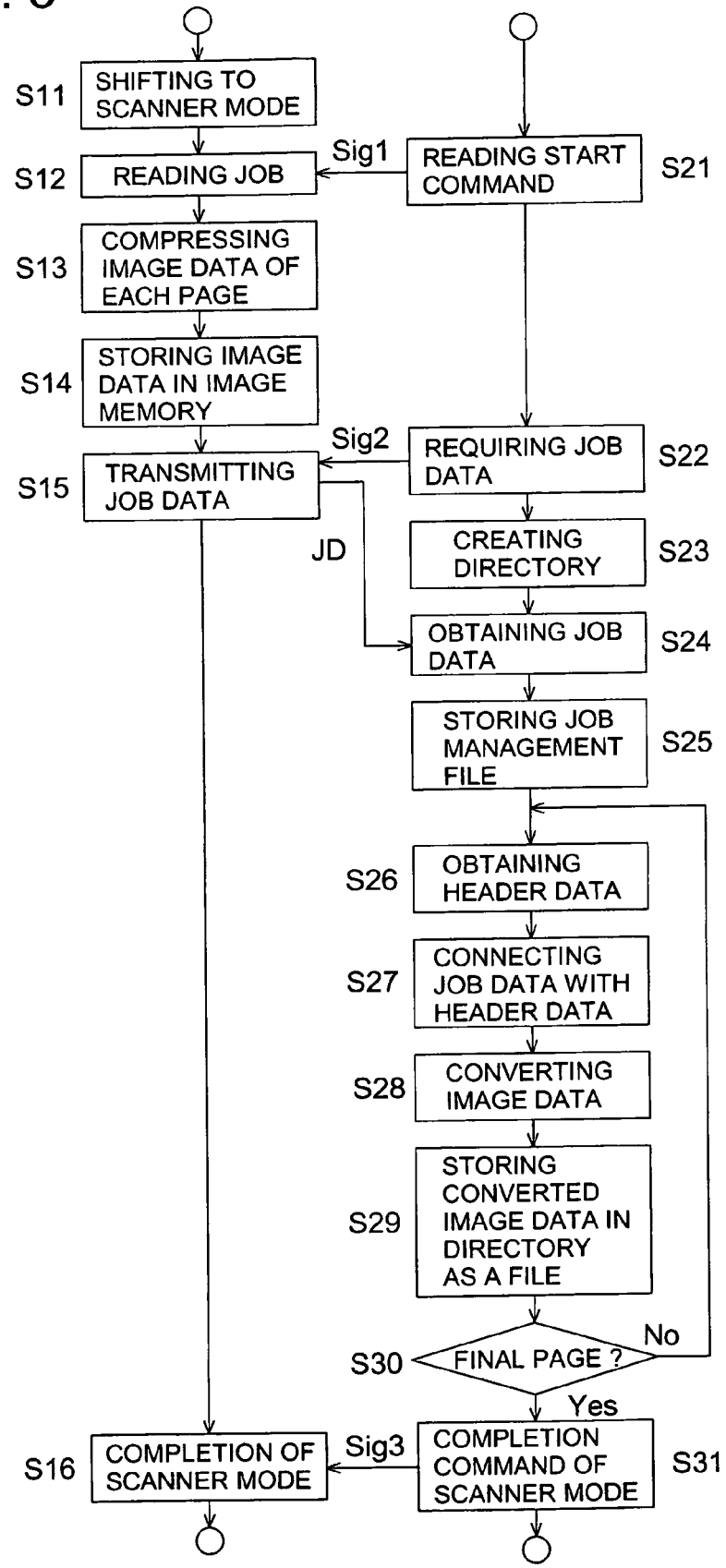
FIG. 3 shows an explanatory flowchart of a scanner mode.

The scanner mode in which the data stored in image memory 14 of image-forming apparatus 1 are transferred to information-processing apparatus 3 through network NW, will be detailed, referring to FIG. 3, which shows an explanatory flowchart of the scanner mode. Incidentally, the image data storing program is activated in information-processing apparatus 3.

At first, the user pushes the scanner mode button equipped on the operating section (not shown in the drawings) of image-forming apparatus 1 to shift it into the scanner mode (S11). Incidentally, it is also possible to shift image-forming apparatus 1 into the scanner mode by the command signal sent from information-processing apparatus 3 through network NW.

Then, the user puts the documents to be read on the document tray (not shown in the drawings), and returns to information-processing apparatus 3 to push the reading start button. Incidentally, hereinafter, the description of "to push the reading start button" is, for instance, to push a key of the keyboard (not shown in the drawings) of information-processing apparatus 3, or to select a button displayed on the screen of monitor section 33. When the user pushes the reading start button, information-processing apparatus 3 transfers reading start signal Sig1 to image-forming apparatus 1 through network NW (S21). When image-forming apparatus 1 receives reading start signal Sig1, based on reading start signal Sig1, the automatic document feeder (not shown in the drawings) conveys the document one by one from the document tray to scanning section 12 by which the image on each document is sequentially read one by one, so as to read the images residing on a plurality of the documents (S12). Incidentally, it is also applicable that the reading of the document is commenced by pushing the reading start button equipped on the operating section (not shown in the drawings), instead of the reading start signal sent from information-processing-apparatus 3.

The image data, read by scanning section 12, are compressed by compression/expansion circuit 13 (S13), and stored in image memory 14 as the compressed image data (S14). At the same time, the compressed image data are connected with the header data of each image to store page data Pn (refer to FIG. 2) at a unit page of the document.

Next, the user pushes the job data request button (not shown in the drawings) of information-processing apparatus 3. Then, the information-processing apparatus 3 transmits transmission request signal Sig2 to image-forming apparatus 1 through network NW (S22), and successively, creates the predetermined directory (S23).

When receiving transmission request signal Sig2, image-forming apparatus 1 transmits job data JD, stored in image memory 14 in step 14, to information-processing apparatus 3. When obtaining job data JD transmitted from image-forming apparatus 1, information-processing apparatus 3 stores the contents, described in job data area 101, into the created directory as a job-controlling file (S25). Successively, information-processing apparatus 3 decodes the data described in job data area 101 to obtain the contents (the header data) of header data area H1, belonging to page data P1 of the first page of the documents (S26), and, after connecting it to the end of the job-controlling file, stores (overwrites) in the created directory as the job-controlling file.

On the other hand, CPU 11 readout the expansion program stored in hard disk 31, and expands the compressed image data of compressed image data area D1 by performing the expansion program as one module of the image data storing program to generate the image data. Then, the image data is converted to the general-purpose image format (such as the BPM format, JPEG format, etc.) (S28), which is stored in the created directory as an image file (S29).

Information-processing apparatus 3 determines whether or not the image file, stored in step S29, is generated from the final page data of the unit job concerned (S30) by decoding the data of job data area 101 (or the job controlling file, which is also applicable). When not in step S30, information-processing apparatus 3 returns to step S26, and repeats the processing with regard to next page data in the loop from step S26 to step S30, until the final page is detected. When determining that the image file is generated from the final page data, information-processing apparatus 3 exits the loop, and transmits command signal Sig3 for finalizing the scanner mode to image-forming apparatus 1 (S31). Incidentally, "to store a file in the directory" is one mode of storing a file in hard disk 32.

When receiving command signal Sig3 in step S31, image-forming apparatus 1 deactivates the scanner mode, and shifts to another mode, such as, for instance, the printer mode (to be detailed later) or the copy mode serving as a copier. Incidentally, it is also possible the scanner mode is deactivated by pushing the button for deactivating the scanner mode (not shown in the drawings), equipped on the operating section (not shown in the drawings) of image-forming apparatus 1, instead of command signal Sig3 sent from information-processing apparatus 3. At that time, it is possible to erase the compressed image data stored in image-forming apparatus 1.

As mentioned above, in the embodiment of the present invention, since image-forming apparatus 1 transfers the compressed image data having a compact data size, instead of the original image data having an enormous data size, to information-processing apparatus 3 through network NW, the effective transmission of the image data can be achieved without occupying network NW and without increasing the traffic amount of the data on the network.

In the abovementioned embodiment of the present invention, the image forming system is so constituted that, during the time from the activation of the scanner mode (step S11) to the finalization of the scanner mode (step S16), another user cannot use image-forming apparatus 1, namely, a ban of performing a new job by disabling the reading operation of the documents or the image forming operations. This is because, it is undesirable in a security and privacy point of view that, when another user operates scanning section 12 of image-forming apparatus 1 activating on the scanner node, the user, who currently use image-forming apparatus 1 in the scanner mode, can view the images, which are inputted by another user, on the monitor of information-processing apparatus 3. It may be possible, however, to allow another user to use image-forming apparatus 1 during the scanner mode.

Further, although the configuration, in which job data JD is transferred to information-processing apparatus 3 during the scanner mode, is exemplified in the present embodiment, it is also applicable such a configuration that job data JD, which are accumulated in image memory 14 during the copy mode, are transferred to information-processing apparatus 3.

Still further, although the configuration, in which the image file, converted to the general purpose format in step S28, is stored in the created directory in step S29, is exemplified in the present embodiment, sometimes, hard disk 32 is utilized as a virtual memory when the operating system requires the virtual memory. In addition, it is also applicable such a configuration that the compressed image data are temporarily stored in a temporary directory (a directory for a temporary use) as a file, and after converting the compressed image data to the general purpose format, the converted image data is finally stored in the directory created in step S31 as the image file.

In the abovementioned flowchart, the operations included in the steps from step S11 to step S16 are conducted by the control program of image-forming apparatus 1, while the operations included in the steps from step S21 to step S31 are conducted by the image data storing program of information-processing apparatus 3. The combination of CPU 11 and CPU 31 performs the distributed processing trough network NW based on the control program and the image data storing program to materialize the image forming system embodied in the present invention.

Figure 4:
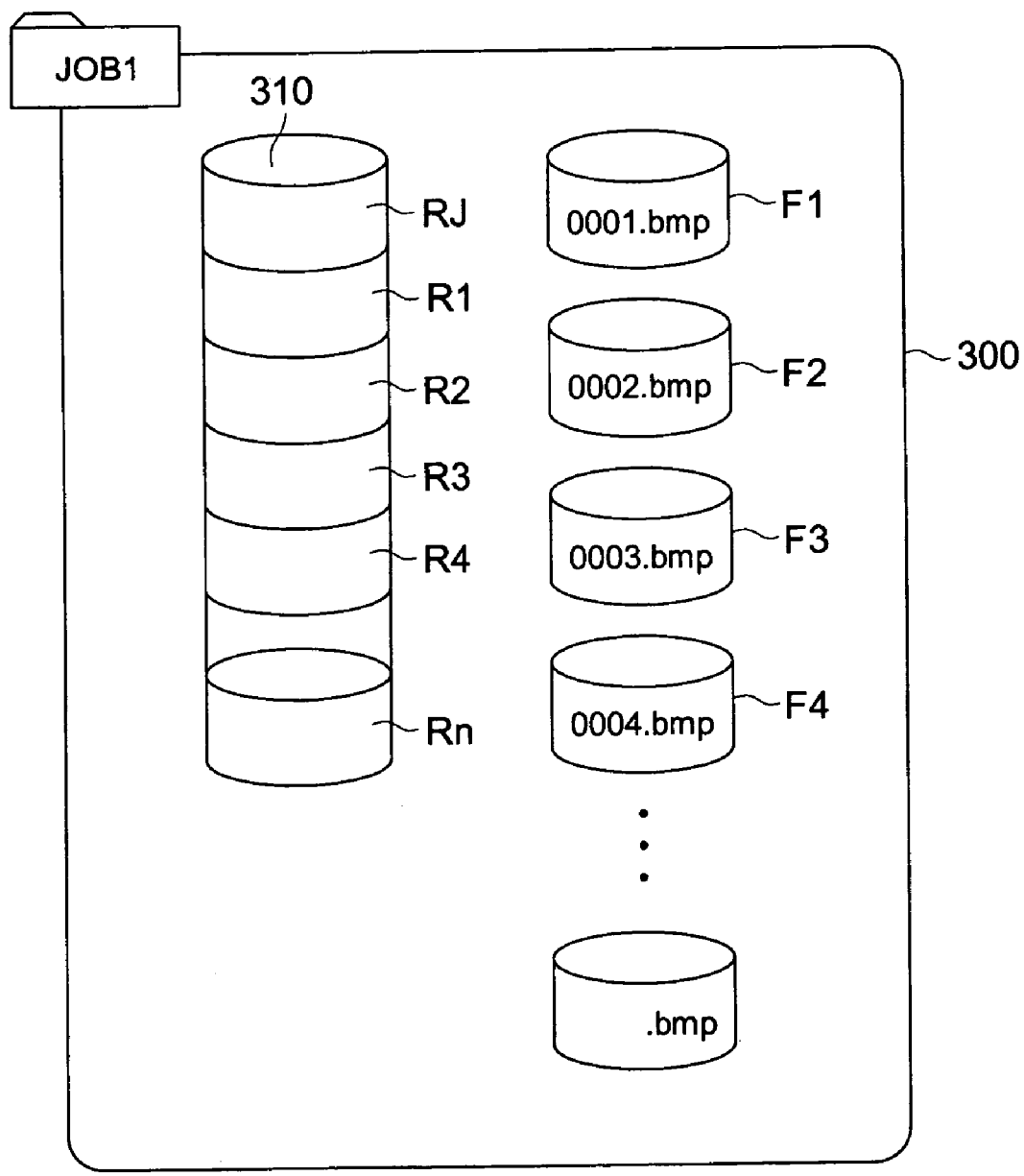
FIG. 4 shows a conceptional schematic for explaining a directory created in a hard-disk equipped in the information-processing apparatus and files to be stored in the directory.

FIG. 4 shows a conceptional schematic for explaining the directory created in hard-disk 32 equipped in information-processing apparatus 3 and files to be stored in the directory.

Directory 300 is a hierarchy itself in the hierarchical structure, which is created in hard-disk 32 by the operating system to control the files. In the file management function performed by the operating system, the files, stored in an arbitral directory and the directory concerned, are handled as a group of data by discriminating the individual hierarchical structure. It is possible for the user to create an arbitral directory by using the file management function of the operating system, and further, it is also possible that the application software for editing images creates an arbitral directory by calling the file management function. It is possible that the user operates the operating system to display the hierarchical structure and the list of the files stored in the arbitral directory on monitor section 33.

Job management file 310 is generated by connecting the job data described in job data area 101 with the header data described in header data area Hn (step S27 shown in FIG. 3), and stored in directory 300. In job management file 310, job data record RJ, which describes job data, and header records R1–Rn, each of which is the header data described in each of header data areas H1–Hn, are connected each other in the order shown in FIG. 4.

Image file F1 is generated from the compressed image data described in compressed image data area D1 by expanding the compressed image data and converting the reproduced image data into the bit map format, and stored in directory 300 as well as job management file 310. As follows, image files F2–Fn correspond to compressed image data areas D2–Dn, respectively, and are stored in directory 300 as well.

The user can select and edit an arbitral image file Fn by operating the application software for editing images. In this case, the user operates the keyboard or the mouse equipped at information-processing apparatus 3 to specify an image file to be edited, by means of the file management function provided by the operating system through the application software for editing images, and to edit the image file Fn by using the image processing function provided by the application software for editing images. Examples of editing an image file include such a case that, for instance, a certain logo-mark is inserted into a specific position of the image area. In this case, the edited image file is stored with the same name as that before editing, namely, the overwrite operation.

In the abovementioned case of editing, there is a possibility that, sometimes, the consistency between record Rn of job management file 310 and image file Fn would be lost. The cases of loosing the consistency include, for instance, a case of enlarging or reducing the image file Fn, a case of trimming the image, a case of converting the color image to the monochrome image, etc. Even for other editing cases, the length of the data would possibly be changed. Accordingly, in the image forming system embodied in the present invention, when transferring image file Fn to image memory 14 of image-forming apparatus 1, the contents of record Rn is revised to new one based on the properties of the edited image file Fn to keep the consistency mentioned above.

(2) The Printer Mode

Figure 11:
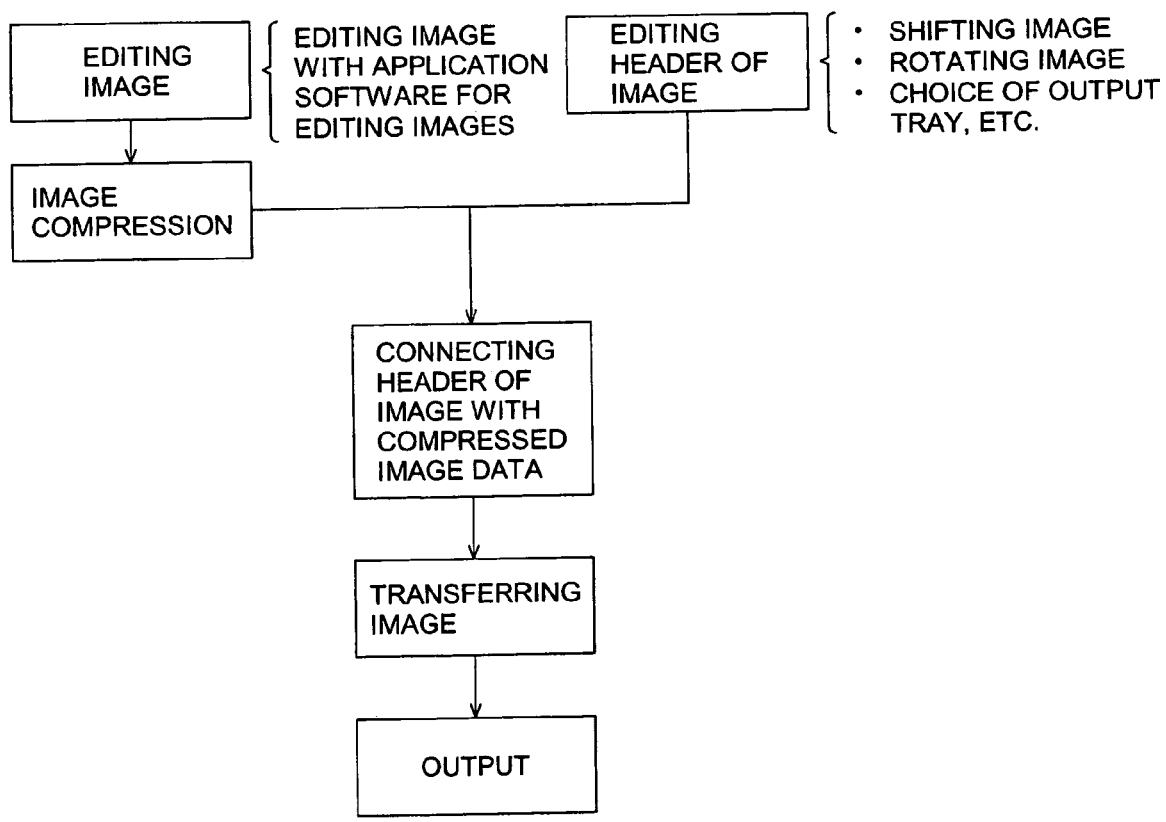
FIG. 11 shows a conceptional flowchart for explaining operations in a printer mode.

In regard to the printer mode, in which the image data generated by information-processing apparatus 3 is transferred to image-forming apparatus 1 through network NW to form the image in printing section 15, its positioning and total conception will be detailed in the following, referring FIG. 11.

In the printer mode, printing operations are conducted based on the data obtained by the scanner mode. Specifically in the printer mode, it is possible to surely utilize the editing results, obtained in information-processing apparatus 3, for image forming operations performed in image-forming apparatus 1. Namely, even if the image data, read in the scanner mode, are edited, and then, returned to image-forming apparatus 1, image forming operations can be precisely performed in image-forming apparatus 1. This is because, as shown in FIG. 11, the image forming system is so constituted that the edited image data can be combined with the header data after the editing operations are completed.

When assuming that only the data, with regard to the image, are transferred to information-processing apparatus 3 from image-forming apparatus 1, it is impossible for printing section 15 of image-forming apparatus 1 to conduct normal image forming operations due to a lack of such data as shown in FIG. 2 (the data described in job data area 101, header data areas H1–Hn, etc.), even if the compressing format of the image data is converted again to the other compressing format suitable for the printer. Even if the header data, etc. are still alive in image-forming apparatus 1 without being overwritten, there is a possibility that the normal printing operations cannot be conducted with the header data, etc., remaining in image-forming apparatus 1, when the original image is changed to another one, in which, for instance, the length of the data is changed after editing the original image data as aforementioned, etc.

In the image forming system embodied in the present invention, however, since the image data and the header data are separately stored in different areas in the scanner mode, when the user edits only the image data necessary to be edited and outputs the edited image from printing section 15 of image-forming apparatus 1, it is possible to restore the data format, which make it possible for printing section 15 to print the normal image.

Figure 5:
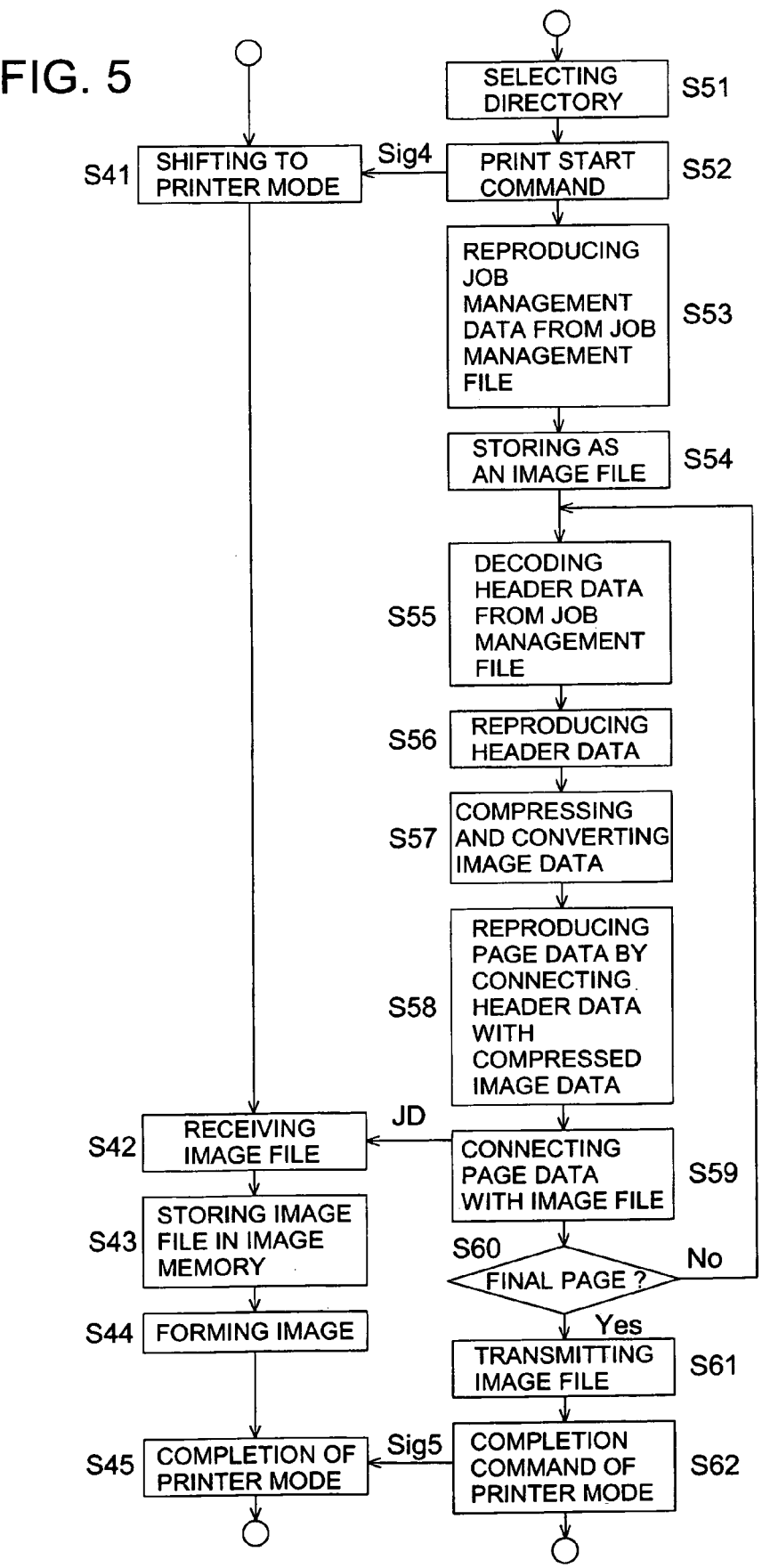
FIG. 5 shows an explanatory flowchart of a printer mode.

The flow of operations with regard to the printer mode will be detailed in the following, referring to a flowchart shown in FIG. 5.

Initially, the user activates the application software for editing images to edit image file Fn by confirming the contents of the image displayed on monitor section 33 with his eyes. When completing the editing operations, image file Fn is stored in directory 300. At this time, when the user wishes to execute the image forming job, the user select directory 300 (S51) and pushes the printer mode starting button of the image data storing program at information-processing apparatus 3. Then, print start signal Sig4 is transferred to image-forming apparatus 1 from information-processing apparatus 3 through network NW (S52). When receiving print start signal Sig4, image-forming apparatus 1 is shifted to the printer mode (S41). Alternatively, it is also applicable that image-forming apparatus 1 can be shifted to the printer mode by pushing the button equipped on the operating section of image-forming apparatus 1.

On the other hand, the image data storing program, activated in the information-processing apparatus 3, reproduces the job data to be described in job data area 101 from job management file 310 stored in directory 300 (S53), and stores it in hard-disk 32 as, an image file (S54), and successively, decodes job management file 310 (S55) to reproduce the header data to be described in header data area H1 from record R1 (S56), and successively, converts and compresses image file F1 to reproduce the compressed image data to be described in compressed image data area D1 (S57). The converting operation of image file F1 is conducted by the image data storing program to create an independent image file most suitable for the hardware structure of printing section 15. The compressing operation of image file F1 is performed in such a manner that CPU 31 readout the compressing program stored in hard-disk 32 and executes the compressing program as a module of the image data storing program to obtain the compressed image data.

Further, the header data reproduced in step S56 is connected to the compressed image data reproduced in step S57 to reproduce page data P1. Incidentally, when conducting no editing operations, page data P1 reproduced in the above coincides with page data P1 described referring to FIG. 2, while, when conducting editing operations, does not coincide each other. In any case, the image of the first page is formed based on page data P1 in the unit job conducted by image-forming apparatus 1.

The flowchart of the printer mode further comprises the steps of: step S59, connecting page data P1 to the image file stored in step S54; step S60, revising the image file stored in step S54 and determining whether or not page data P1 corresponds to the final page of the unit job, and retuning to step S55 to enter the loop for repeating the operations from step S55 to step S59 when determining that page data P1 does not correspond to the final page, or entering step S61 when determining that page data Pn corresponds to the final page; step S61, transferring the image file to image-forming apparatus 1, the image file being substantially equivalent to job data JD, in which only a potion edited by the application software for editing images and the header data corresponding to the changed portion are different each other; step S42, receiving the image file; and step S43, storing the image file in image memory 14 as a job data.

Since the image file is substantially equivalent to job data JD explained referring to FIG. 2, under the control program executed by CPU 11, compression/expansion circuit 13 expands the job data stored in image memory 14, and the expanded job data are sent to printing section 15 to form the image on the recording sheet based on the expanded job data (step S44).

Accordingly, in the image forming operation of step S44, the image, which reflects the editing results conducted by the user with the application software for editing images at information-processing apparatus 3, is outputted on the recording sheet. When the image forming operation completed, hereafter, image-forming apparatus 1 outputs a printer mode finishing signal to deactivate the printer mode, and notifies the image data storing program at information-processing apparatus 3 of the completion of the printer mode, which is displayed on the screen.

In the abovementioned flowchart, the operations included in the steps from step S41 to step S45 are conducted by the control program of image-forming apparatus 1, while the operations included in the steps from step S51 to step S62 are conducted by the image data storing program of information-processing apparatus 3.

Incidentally, the following merits can be further derived from the abovementioned configuration in which a plurality of the header data are separated, and stored as a group.

Since the file size of the image data transferred from the copier is relatively huge, it is cumbersome for a personal computer, serving as an information-processing apparatus, to handle such the huge file. For instance, when a certain format of the image data for A4 size is converted to BMP file format so as to easily display the image on the screen, the file size even becomes 1.8 Mega-bites. Conventionally, to modify the pixel data of the image, the BMP file is opened and operated by means of the application software for editing images. However, in case of grasping an outline of the whole job, it is possible to grasp the outline of the whole job by storing a plurality of the header data in a group, without opening each of the image data having the huge file size.

For instance, the header of the image data includes such data of width, height, resolution, etc. with regard to each of the pages. Accordingly, to grasp the contents of the unit job including 100 pages, it is not necessary to open 100 image files, but necessary to open only one file, namely, the job management file stored in the directory.

Further, since the header of the image data also includes data of a shift amount of each page (a print start position in practice), when the user wishes to print the shifted image, it is possible to only edit the shift amount of the header file without modifying the image data itself. In this case, the system has a merit of the high-speed image processing. In addition, since the header of the image data also includes data of a rotating amount of each page (either zero or 180 degree rotation), when the user wishes to print the rotated image, it is possible to only edit the rotating amount of the header file without modifying the image data itself. In this case, the image processing can be performed at high-speed as well.

Namely, it is possible to change the printing results of the image printout only by editing the header file, without opening each of the image data having a huge data size. Incidentally, it is necessary to provide a tool for editing the header file in advance in information-processing apparatus 3.

As described in the above, according to the image forming system embodied in the present invention, to store the image data of image forming apparatus 1 in information-processing apparatus 3, it becomes possible that the directory is created every unit job, and then, the image data is stored in the created directory after converting it to a general-purpose image file. Accordingly, since the user can edit the image file with the familiar application software for editing images, and can print the image based on the edited image data, after transferring the concerned directory to image forming apparatus 1 as the job data, it becomes possible to transfer the image data, generated by image forming apparatus 1, to information-processing apparatus 3, so that the image data can be easily handled by the application software for editing images, executed in information-processing apparatus 3.

Further, although the configuration, in which the transmitting operation of the image file and the printing operation of image forming apparatus 1 are continuously executed, is exemplified in the above, another configuration is also applicable, in which the image data storing program only works for storing the image file in image memory 14 as the job data, while the user directly operates a button located at image forming apparatus 1 to output the printout with regard to the unit job concerned.

Still further, although the configuration, in which the image data storing program is executed in information-processing apparatus 3, is exemplified in the above, it is also applicable that the image data storing program is executed in image forming apparatus 1. In this case, the image forming system can be so constituted that, in the scanner mode, the operations from step S24 to step S30, shown in FIG. 3, are executed in image forming apparatus 1, while job management file 310 and image file Fn are stored in the directory, which is created at information-processing apparatus 3 in step S23, and that, in the printer mode, after transferring job management file 310 and image file Fn, both of which are stored in directory 300, through network NW, the operations from step S53 to step S60, shown in FIG. 3, are executed in image forming apparatus 1.

According to the image forming system, the image data storing method and the recording media, embodied in the present invention, even when transferring the image data generated by reading the document including a plurality of pages as a consecutive unit job, it becomes possible to transfer the image data so as to make it easy for the user to handle the image data on the software.

Next, another embodiment of the present invention will be detailed in the following, referring to drawings. Incidentally, in the following embodiment, the image forming apparatus and the information-processing apparatus are a digital copier and a personal computer, respectively.

Figure 6:
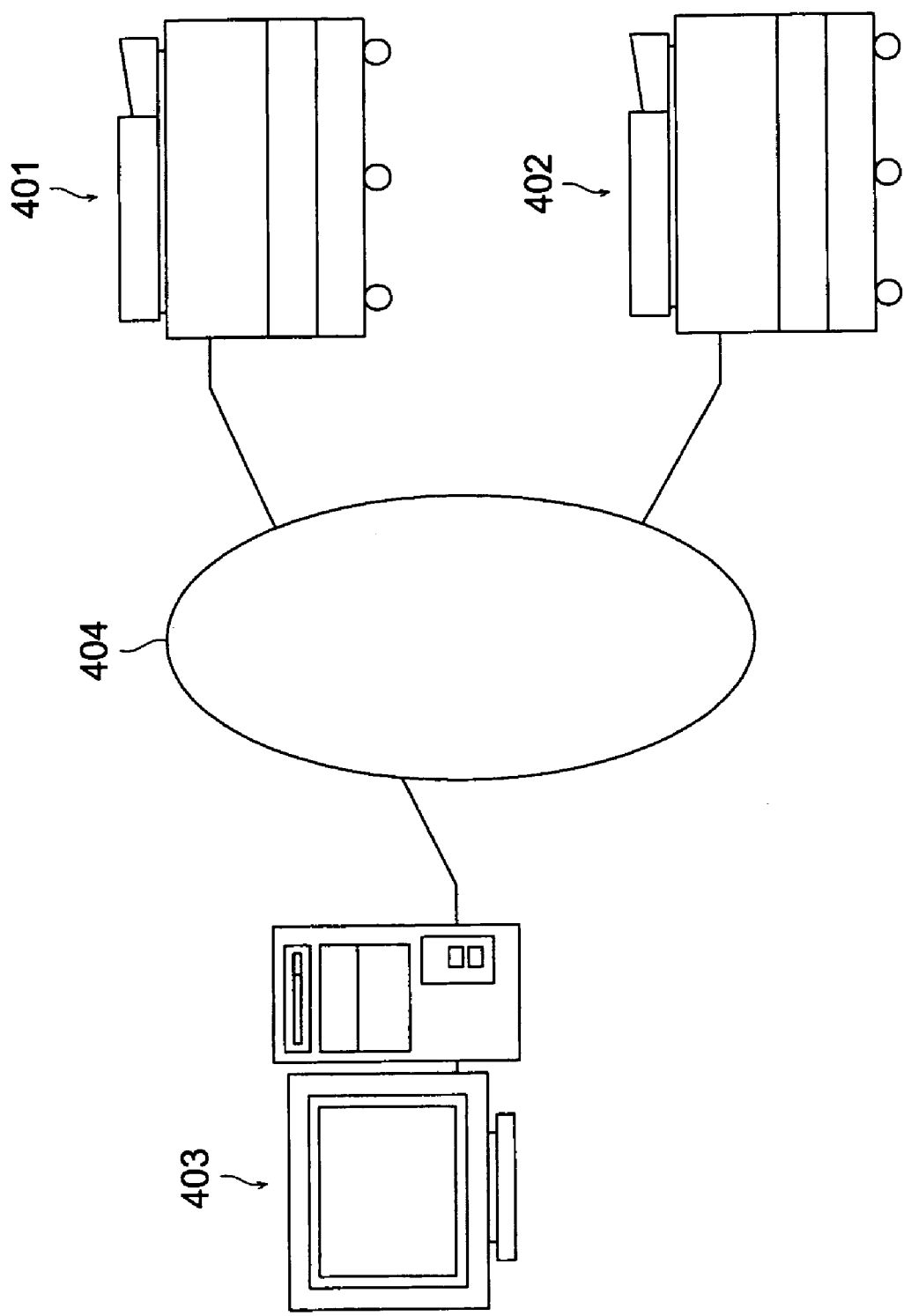
FIG. 6 shows a block-diagram of the image forming system, embodied in the present invention, illustrating a configuration of an exemplified embodiment.

FIG. 6 shows a block-diagram of the image forming system, embodied in the present invention, illustrating the configuration of an exemplified embodiment.

In the present embodiment, the image forming system comprises two digital copiers 401, 402, each of which can independently conduct operations for reading (scanning) a document and forming (printing) an image. In addition, since two digital copiers 401, 402 are coupled each other in network 404, it is also possible that, for instance, the image data, generated by reading the image in digital copier 401, are transferred to digital copier 402, which forms the image based on the transferred image data, and its reverse operation is also possible.

Further, in the present embodiment, personal computer 403 is also connected to network 404. Personal computer 403 can send command signals for reading an image, forming the image, transferring the image data, etc. to digital copiers 401, 402. In addition, personal computer 403 can transfers the image data, stored in personal computer 403 itself to digital copier 401 or 402, so that digital copier 401 or 402 forms the image based on the transferred image data, and also can transfers the image data, read by digital copier 401 or 402, to personal computer 403, in order to edit and store the transferred image data in personal computer 403.

In FIG. 6, any kind of network, such as, for instance, the Ethernet serving as a LAN (Local Area Network), etc., can be employed for network 404.

Figure 7:
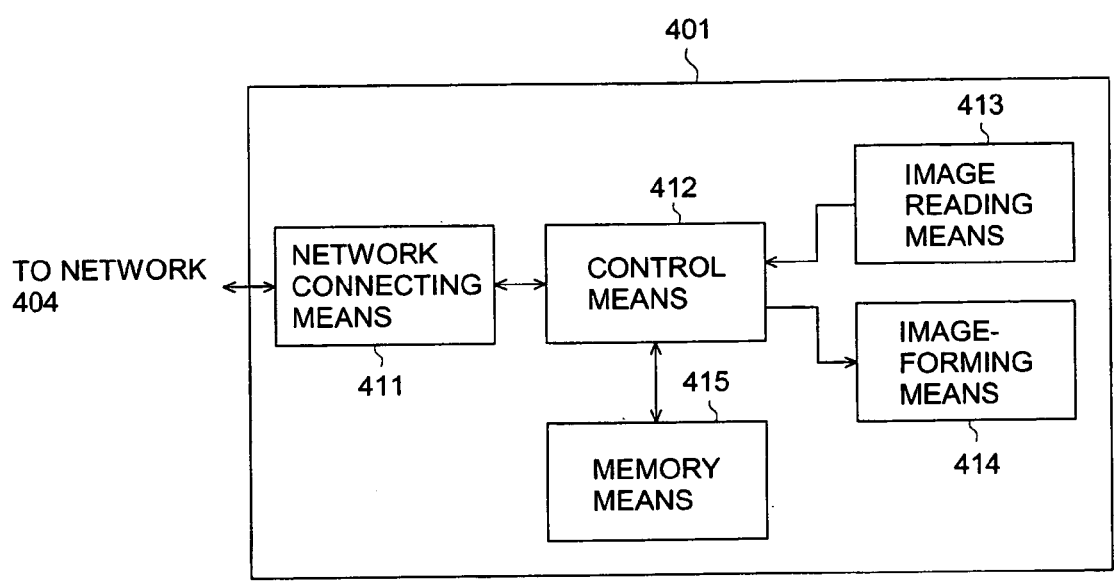
FIG. 7 shows a block-diagram of a structure of a digital copier shown in FIG. 6.

FIG. 7 shows a block-diagram of the structure of digital copier 401 shown in FIG. 6.

Since the structure of digital copier 401 is the same as that of digital copier 402, only the structure of digital copier 401 will be detailed in the following.

Digital copier 401 is comprised of network connecting means 411 serving as an interface to network 404 shown in FIG. 6, control means 412 for controlling the whole operations of digital copier 401, image reading means 413 for reading the image from the document, image forming means for forming the image onto a recording sheet, for instance, a paper, etc., and memory means 415 for storing the image data read by image reading means 413. Memory means 415 is comprised of, for instance, DRAM memories.

Figure 8:
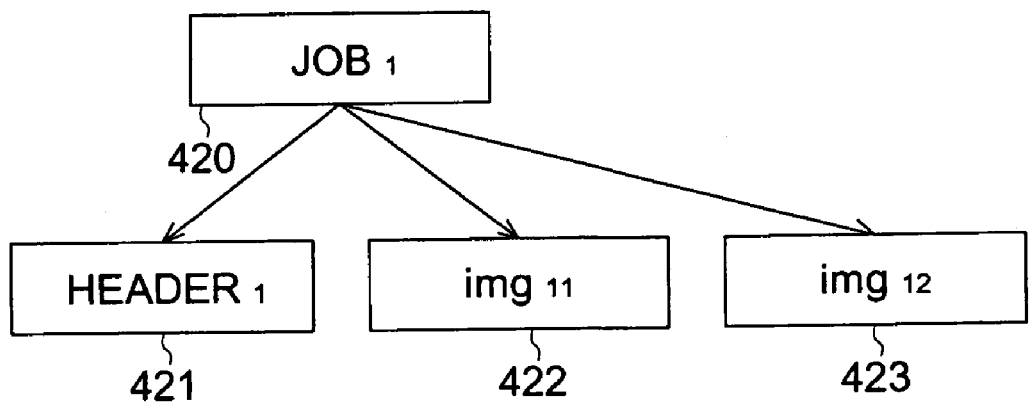
FIG. 8 shows a format of data, which are transmitted between the digital copier shown in FIG. 6 and a personal computer.

FIG. 8 shows a format of data, which are transmitted between digital copier 401 and personal computer 403.

In the present embodiment, the format of data, which are transmitted between digital copier 401 and personal computer 403, has a directory structure shown in FIG. 8.

In FIG. 8, numeral 420 indicates a job directory for one unit job, numeral 421 indicates a header file, which includes such data for determining whether or not the duplex printing should be conducted, choosing the suitable paper tray, etc., and numerals 422, 423 indicate image files to be printed in the unit job. Header file 421 and image files 422, 423 are stored under job directory 420.

Image files 422, 423 are generated and stored by compressing the image data read by, for instance, image reading means 413 shown in FIG. 7. For this purpose, various kinds of conventional compressing methods are available for compressing the image data.

Job directory 420 shown in FIG. 8 is transferred from digital copier 401 to personal computer 403, or from personal computer to digital copier 401, as it is. At this time, since image files 422, 423, included in job directory 420, are the compressed image data compressed by a predetermined compressing method, it is possible to shorten the transferring time, compared to the conventional transferring method in which the image data are transferred without the compressing process. In addition, since the transferring operation is performed in the unit job, it is possible to control the jobs in an easy way, and, even in the network environment in which the image-forming apparatus and the information-processing apparatus are coupled each other, it is possible to maintain effects of conducting the printing operation in the unit job.

Further, when personal computer 403 receives job directory 420, shown in FIG. 8, from digital copier 401, personal computer 403 stores job directory 420 in the memory mean provided in personal computer 403, for instance, a hard-disk, as it is. At this time, since image files 422, 423 are the compressed image data compressed by a predetermined compressing method as aforementioned, it is possible to reduce the memory capacity of the memory mean provided in personal computer 403, compared to the conventional storing method in which the image data are stored in the memory as it is without compressing.

Incidentally, although the job directory itself, including the image files, is transferred in the abovementioned embodiment, the present invention is not limited to the above. It is also applicable that the sender notifies the receiver of the job structure while successively transferring the files in the job directory, and the receiver creates the directory having the structure concerned while storing the files in the created directory. It is possible to control the unit job in the abovementioned method.

Incidentally, when viewing the image at personal computer 403, the compressed image data of image files 422, 423 are expanded to reproduce the original image data. In addition, when modifying the image, the original image data are reproduced as well, and after completing the modifying operations, the modified image data are compressed again to store them again in the memory mean provided in personal computer 403.

As described in the abovementioned embodiment, since the compressed image data are stored in personal computer 403, when transferring the compressed image data, only the transferring operation is conducted without conducting the expanding operation, resulting in the high-speed data transmission being faster than such a case that the data to be stored in the personal computer are not compressed despite that the data to be transferred are compressed.

Further, in the abovementioned embodiment, header file 421 is provided under job directory 420 to store the data, necessary for performing the unit job, in header file 421. Accordingly, it is possible to edit the contents of header file 421 at personal computer 403. In other words, the user can easily modify the unit job by editing and re-writhing the contents of header file 421. Then, the modified unit job is transferred to, for instance, digital copier 401 to execute the modified unit job.

Further, for instance, in case that the image file, stored under job directory 420, are named consecutive numbers in order of printing, it is possible to change the order of printing only by renaming the image file without modifying the substances of the image files, and it is very convenient for the user. In this case, it is also possible to reduce the number of the images to be printed, by renaming the image files, not to be printed, names other than the consecutive numbers, namely, by deleting the image files, not to be printed, from the consecutive numbers. Further, In this case, it is also possible to increase the number of the images to be printed, by adding new consecutive numbers to the original consecutive numbers after copying the image files included in the original unit job, and by allotting the new image files to the new consecutive numbers.

Further, personal computer 403 can conduct a combining operation of jobs, which will be detailed in the following.

Figure 9:
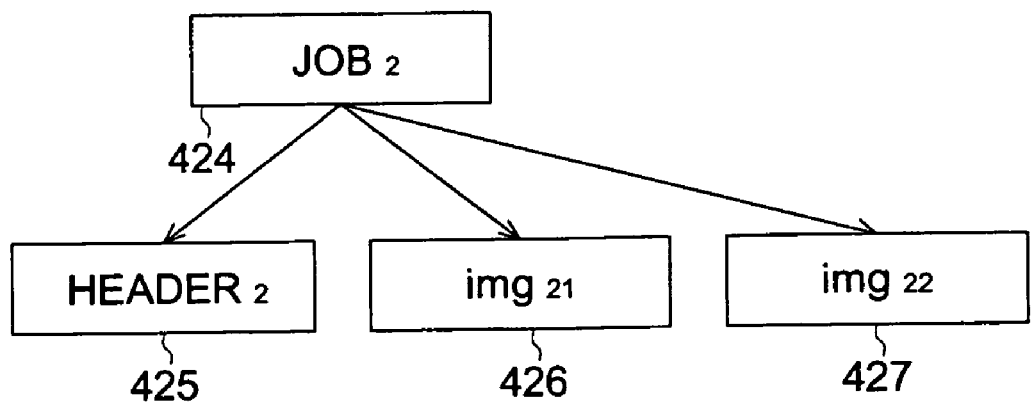
FIG. 9 shows a job directory, which combines with the job directory shown in FIG. 8.

FIG. 9 shows a job directory, which combines with job directory 420.

Job directory 424, shown in FIG. 9, has header file 425 and image files 426, 427 under job directory 424.

Personal computer 403 can combine job directory 420, shown in FIG. 8, with job directory 424, shown in FIG. 9, to create one job.

Initially, personal computer 403 determines whether or not both jobs can be combined each other by comparing the header file of one job with that of the other job. When a certain contradiction occurs in the combination of both jobs, for instance, due to the difference of duplex and one side printing modes between the job of job directory 420 and the other job of job directory 424, personal computer 403 determines that both jobs cannot be combined.

When personal computer 403 determines that no contradiction occurs in the combination of both jobs, as a result of the comparison between both header files, personal computer 403 executes the combining operation of the jobs.

Figure 10:
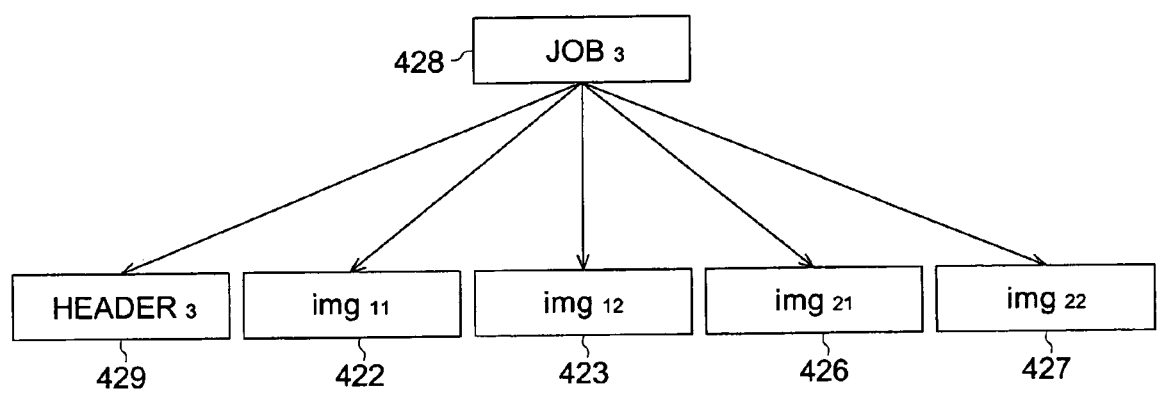
FIG. 10 shows a job directory, as a result of combining the job directory shown in FIG. 8, with the job directory shown in FIG. 9, into one job.

FIG. 10 shows a job directory, as a result of combining job directory 420, shown in FIG. 8, with job directory 424, shown in FIG. 9, into one job.

As shown in FIG. 10, job directory 428, generated by combining job directory 420 with job directory 424, is comprised of header file 429, generated by combining header file 421, shown in FIG. 8, with header file 425, shown in FIG. 9, without occurring any contradictions, image files 422, 423, shown in FIG. 8, and image files 426, 427, shown in FIG. 9.

Therefore, according to the abovementioned embodiment, since a plurality of jobs can be executed merely by executing one job in which a plurality of the jobs are combined each other, it is possible to save the time for repeatedly transferring many job directories to digital copier 401.

Incidentally, in the abovementioned embodiment, for instance, before personal computer 403 transfers the job directory to digital copier 401, personal computer 403 negotiates with digital copier 401 about the transfer capacity concerned. Conventionally, since the personal computer transfers, for instance, the image file at an arbitral time without negotiations, sometimes, the transferring operation is failed in a mid-course of the operation due to an insufficiency of the memory capacity at the receiver side, resulting in a waste of time for transferring data by the time of the failure.

In the abovementioned embodiment, to overcome the abovementioned drawback, before personal computer 403 commences the transferring operation of the job directory, personal computer 403 determines whether or not the receiver (such as digital copier 401) currently has the sufficiently vacant capacity in its memory to store the job directory concerned by negotiating with the receiver. Since personal computer 403 grasps the total capacity of the job directory to be transferred, while digital copier 401 grasps the vacant capacity of memory means 15, the negotiation about the memory capacity between personal computer 403 and digital copier 401 becomes possible.

Therefore, according to the abovementioned embodiment, it is possible to eliminate the waste of the transferring time occurring in the conventional systems, by negotiating about the transferring capacity in advance of transferring the job directory and by stopping the transferring operation when the sufficiently vacant capacity is not provided in the receiver.

It is applicable that, when the transferring operation of the job directory from personal computer 403 to digital copier 401 is completed, digital copier 401 automatically commences the execution of the job received from personal computer 403, namely, the printing operation.

Incidentally, personal computer 403 of the abovementioned embodiment can simultaneously conduct the receiving operation and the sending operation of the job directory. In other words, in the abovementioned embodiment, the file transfer protocol or etc., which are conventionally well known, is employed for controlling the bilateral data transmission between personal computer 403 and digital copiers 401, 402. The file transfer protocol allows personal computer 403 to transfer a job directory already stored in the hard-disk to digital copier 402, while receiving another job directory from digital copier 401.

Therefore, according to the abovementioned embodiment, it is possible to simultaneously conduct a plurality of transferring actions without monopolizing personal computer 403 for one transferring action, resulting in an improvement of the working efficiency of the system.

Incidentally, digital copiers 401, 402 of the abovementioned embodiment provide overlay images in advance. The overlay images include character images, such as "IMPORTANT", "CONFIDENTIAL", etc., and predetermined illustrated images, which are automatically overwritten on the image, outputted by the user, based on the user's commands.

In the abovementioned embodiment, the user can create such the overlay images at personal computer 403, and can register the created overlay images in digital copier 401 or 402.

Initially, the user creates a certain overlay image by using the bit-map editor, etc. at personal computer 403. Then, the created overlay image is compressed and converted to the same format as that of the overlay images already stored in digital copier 401 or 402. Personal computer 403 transfers the compressed and converted overlay image to digital copier 401 or 402, which stores the received overlay image in the memory means as well as the overlay images already stored. The memory means is a non-volatile memory, such as the hard-disk, etc., so as to make it possible to repeatedly use the overlay images hereafter.

Conventionally, since the abovementioned means for registering the overlay image created at personal computer 403 has not been provided, for instance, it has been only possible to register the image, read by the scanner in the copier, as the overlay image. In this case, there have been such the problems that the overlay image becomes coarse under the influence of the reading resolution capacity of the scanner, and adjustment of the size of the overlay image is difficult.

According to the abovementioned embodiment, since the image, to be registered as an overlay image, can be created at, for instance, the personal computer, it is possible to effectively obtain a desirable image.

As aforementioned, according to the present invention, in the network environment in which the image-forming apparatus and the information-processing apparatus are coupled each other, it is possible to provide an image-forming system, which makes it possible to effectively conduct the transferring and editing operations of images, etc.

Disclosed embodiment can be varied by a skilled person without departing from the spirit and scope of the invention.

What is claimed is:

1. A print job control system on a network system, comprising:
    an image-forming apparatus, which comprises:
        an image reading section to generate first image data by optically scanning a document including a plurality of pages and conducting an optoelectronic converting operation,
        a first memory to store said first image data, header data corresponding to a property of said first image data, and job data corresponding to a property of an image-forming job of said first image data,
        an image-forming section to form images based on said first image data stored said first memory, and
        a first network interface to bilaterally transmit said first image data between said first memory and a network of said network system; and
    a computer, which comprises:
        a second network interface,
        a second memory, and
        a control section to control an operation for storing data, received through said second network interface, in said second memory;
    wherein said control section creates a directory corresponding to said first image data, said header data and said job data in said second memory, and stores in said directory a job management file created based on said header data and said job data, and second image data generated by converting said first image data, and
    wherein said control section transfers said second image data and said job management file, which are stored in said directory, to said image-forming apparatus through said second network interface in a unit of said image-forming job.

2. The print job control system of claim 1, wherein said job management file and said second image data are independently stored in said directory by said control section.

3. The print job control system of claim 1, wherein said computer further comprises an image data editing section, and said second image data is formed to be editable by said image data editing section.

4. The print job control system of claim 3, wherein said image data editing section only edits said second image data, and is adapted to store third image data, which is generated by editing said second image data, in said directory.

5. The print job control system of claim 1, wherein said control section converts a data format of said second image data and said job management file stored in said directory, so that said image-forming apparatus can form said images based on said second image data and said job management file, before transferring said second image data and said job management file to said image-forming apparatus.

6. The print job control system of claim 5, wherein said control section produces file data, in which said header data and said image data are connected to each other, based on said second image data and said job management file, and thereafter transfers said file data to said image-forming apparatus.

7. The print job control system of claim 6, wherein said image-forming apparatus is adapted to form said images based on said file data.

8. The print job control system of claim 1, wherein said computer comprises a monitor for displaying an editing process of said second image data.

9. The print job control system of claim 1, wherein said control section is adapted to transmit a command signal to request transferring of said first image data, said header data and said job data through said second network interface to said image-forming apparatus.

10. The print job control system of claim 9, wherein said image-forming apparatus further comprises a transmitting section to transmit said first image data, said header data and said job data through said first network interface.

11. A method for performing a bilateral data transmission and a data storing operation between an image-forming apparatus, which includes a scanner section and printer section, and a computer or a network, said method comprising:
    transmitting first image data generated from a plurality of pages, header data corresponding to a property of said first image data, and job data corresponding to a property of an image-forming job of said first image data, to said computer from said image-forming apparatus via said network;
    converting said first image data, received by said computer, to second image data;
    creating a job management file based on said header data and said job data;
    creating a directory corresponding to said image forming job in a memory of said computer;
    storing said second image data and said job management file in said directory; and
    transferring said second image data and said job management file, which are stored in said directory, to said image-forming apparatus through a network interface in a unit of said image-forming forming job.

12. The method of claim 11, wherein said job management file and said second image data are independently stored in said directory.

13. The method of claim 11, further comprising:
    converting a data format of said second image data and said job management file red in said directory, so that said image-forming apparatus can form images based on said second image data and said job management file, before transferring said second image data and said job management file to said image-forming apparatus.

14. The method of claim 13, further comprising:
    producing file data, in which said header data and said image data are connected each other, based on said second image data and said job management file.

15. A computer readable image data storing program, for directing a computer to execute a method, comprising:
    receiving first image data generated from a plurality of pages, header data corresponding to a property of said first image data, and job data corresponding to a property of an image-forming job of said first image data;
    converting said first image data, received by said computer, to second image data;
    creating a job management file based on said header data and said job data;

creating a directory corresponding to said image forming job in a memory;

storing said second image data and said job management file in said directory as a unit of said image-forming job; and transferring said second image data and said job management file, which are stored in said directory, to said image-forming apparatus through a network interface in a unit of said image-forming job.

16. The image data storing program of claim 15, wherein said image data storing program is stored on a computer readable recording medium.

17. The image data storing program of claim 15, wherein said job management file and said second image data are independently stored in said directory.

18. The image data storing program of claim 15, said method further comprising:

converting a data format of said second image data and said job management file stored in said directory, so that said image-forming apparatus can form images based on said second image data and said job management file, before transferring said second image data and said job management file to said image-forming apparatus.

19. A computer, which is connectable to a network, comprising:

a network interface, a memory, and a control section to control an operation for storing data received through said network interface in said memory;

wherein said computer receives first image data generated from a plurality of pages, header data corresponding to a property of said first image data and job data corresponding to a property of an image-forming job of said first image data, from an image-forming apparatus coupled to said network, wherein said control section creates a directory corresponding to said image forming job in said memory, and stores in said directory second image data generated by converting said first image data, and a job management file created based on said header data and said job data, and wherein said control section transfers said second image data and said job management file, which are stored in said directory to said image-forming apparatus through said network interface in a unit of said image-forming job.

20. The computer of claim 19, wherein said job management file and said second image data are independently stored in said directory.

21. The computer of claim 19, wherein said control section converts a data format of said second image data and said job management file stored in said directory, so that said image-forming apparatus can form images based on said second image data and said job management file, before transferring said second image data and said job management file to said image-forming apparatus.

* * * * *